United States Patent [19]
Illger et al.

[11] Patent Number: 6,100,309
[45] Date of Patent: *Aug. 8, 2000

[54] PROCESS FOR PREPARING ELASTIC POLYURETHANE SLABSTOCK FOAMS

[75] Inventors: Hans-Walter Illger, Rösrath; Peter Haas, Haan; Robert Eiben, Köln, all of Germany

[73] Assignee: Bayer Aktiengesellschaft, Leverkusen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/859,656

[22] Filed: May 20, 1997

[30] Foreign Application Priority Data

May 28, 1996 [DE] Germany ............... 196 21 305

[51] Int. Cl.$^7$ ....................................... C08J 9/30
[52] U.S. Cl. ................. 521/133; 521/170; 521/174; 521/176
[58] Field of Search ................... 321/133, 170, 321/174, 176

[56] References Cited

U.S. PATENT DOCUMENTS 4,500,656  2/1985  Rasshofer ................. 521/164
5,643,970  7/1997  Sulzbach ................. 521/155

FOREIGN PATENT DOCUMENTS

96/00644  1/1996  WIPO .

OTHER PUBLICATIONS

Oertel, Gunter, *Polyurethane Handbook*, p. 194 Hanser Publishers, N.Y. (1994).

*Primary Examiner*—Patricia A. Short
*Attorney, Agent, or Firm*—Joseph C. Gil; Noland J. Cheung

[57] ABSTRACT

A present invention relates to a process for preparing elastic, flexible slabstock foams by reacting polyisocyanates with at least one polyol having a molecular weight from 2,000 to 10,000, having a functionality of 2 to 4, which have at least two hydrogen atoms capable of reacting with said polyisocyanates; at least one polyol having a molecular weight from 400 to 4,000, having a functionality of 4 to 8 and having at least four hydrogen atoms capable of reacting with isocyanates; water and optionally, organic blowing agents; stabilizers; activators; additives and auxiliary agents; optionally, low molecular weight cross-linking agents with a molecular weight of 32 to 399; and liquid $CO_2$, which is used as an additional blowing agent, and is decompressed in a decompression chamber containing fine-meshed gratings upstream of the discharge point to the conveyer belt.

12 Claims, No Drawings

PROCESS FOR PREPARING ELASTIC POLYURETHANE SLABSTOCK FOAMS

BACKGROUND OF THE INVENTION

The preparation of elastic slabstock foams for a very wide range of applications takes place in the low density region using organic, fully halogenated blowing agents such as monofluorotrichlororomethane, which is no longer used for ecological reasons. In the context of this change-over, dichloromethane (MC) is now frequently used. This blowing agent causes two effects, which is of relevance to foam production. One effect is the lowering of the density as the actual blowing effect and the other effect is the withdrawal of energy from the reacting system during conversion to the gaseous state. As a result, when using large amounts of water, and thus, also isocyanates, it is possible to vary the hardness to a certain extent within the low density region. These types of effects cannot be produced by using water on its own because the exothermal effect produces internal temperatures which cause discolorations in at least the core. A further step in the direction of an ecologically and more soundly based production process is the use of liquid carbon dioxide as a blowing agent, as is described, for example, in DE 4,422,568. Effective operation of the decompression chamber with perforated plate inserts in front of the raw material discharge point is critical for use of this process.

Due to the different energies of evaporation of the blowing agents $CO_2$ and MC, it is not possible to prepare equivalent types of expanded material in a reliable production process because the internal temperature of the slabs is different at comparable densities.

It has now been found that, by means of specific polyols and with liquid $CO_2$ as an additional blowing agent, qualities of expanded materials can be produced without problems relating to production engineering or mechanical properties and that these are characterized by high compressive strength and better elasticity.

SUMMARY OF THE INVENTION

The invention provides a process for preparing elastic slabstock foams by reacting
A) polyisocyanates;
B1) at least one polyol having a molecular weight from 2,000 to 10,000, having a functionality of 2 to 4, which have at least two hydrogen atoms capable of reacting with isocyanates;
B2) at least one polyol having a molecular weight from 400 to 3,000, having at least four hydrogen atoms capable of reacting with isocyanates and a functionality of 4 to 8;
C) water and optionally, organic blowing agents;
D) stabilizers;
E) activators;
F) additives and auxiliary agents;
G) optionally, low molecular weight cross-linking agents with a molecular weight of 32 to 399; and
H) liquid $CO_2$, which is used as an additional blowing agent and is decompressed in a decompression chamber containing fine-meshed gratings upstream of the discharge point to the conveyer belt.

The object of the present invention is to provide elastic polyurethane slabstock foams, using carbon dioxide as a blowing agent, which have the same or better characteristics with respect to density, hardness and elasticity than expanded materials prepared using conventional, physical blowing agents.

DETAILED DESCRIPTION OF THE INVENTION

The invention provides a process for preparing elastic slabstock foams by reacting
A) polyisocyanates;
B1) at least one polyol having a molecular weight from 2,000 to 10,000, having a functionality of 2 to 4, which have at least two hydrogen atoms capable of reacting with isocyanates;
B2) at least one polyol having a molecular weight from 400 to 3,000, having a functionality of 4 to 8 and having at least four hydrogen atoms capable of reacting with isocyanates;
C) water and optionally, organic blowing agents;
D) stabilizers;
E) activators;
F) additives and auxiliary agents;
G) optionally, low molecular weight cross-linking agents with a molecular weight of 32 to 399; and
H) liquid $CO_2$, which is used as an additional blowing agent and is decompressed in a decompression chamber containing fine-meshed gratings upstream of the discharge point to the conveyer belt.

The combination of polyols B1) and B2) and liquid $CO_2$ leads to expanded materials having problem-free operating times for slab lengths of 300–700 m. Additionally, no throughput problem occur in the sensitive region of the decompression chamber, wherein hardnesses are produced, which are above those of conventional expanded materials based on conventional polyols, using the same amount of isocyanate.

Polyol component B1) of the present invention comprises a molecular weight ranging from 2,000 to 10,000 and also has a functionality of 2.0 to 4.0. In a preferred embodiment, polyol component B1) comprises a molecular weight ranging from 3,000 to 5,000 and a functionality ranging from 3.0 to 4.0. Starters for polyols B1), which have functionalities of 2–4, include glycerine, trimethylolpropane and pentaerythritol. These are converted into polyols B1) with the stated range of molecular weights by adding oxiranes.

Polyol component B2) is used in amounts of 2.5–30 parts, preferably 2.5–20 parts, with respect to 100 parts of B1) and B2). Starters with 4 to 8 OH-groups, such as mannitol, sorbitol, lactose and sucrose, are used as starters for polyol component B2). These are converted into polyols B2) with the stated range of molecular weights and with largely primary terminal OH-groups by adding oxiranes. Polyol component B2) of the present invention comprises a molecular weight ranging from 400 to 3,000 and a functionality ranging from 4 to 8. Preferably, the molecular weight ranges from 500 to 3,000 and the functionality ranges from 4 to 6.

The stabilizers, activators, additives and auxiliary agents used in the present invention are generally known and available.

A decompression chamber of the present invention is disclosed in U.S. Pat. No. 5,789,457, which is incorporated by reference herein. The decompression chamber consists of at least one perforated plate with a mesh size of 0.025–0.3 mm, wherein the sum of the cross-sections of the drill holes comprises 10–40 % of the perforated plate. In a preferred embodiment, the mesh size ranges from 0.05 to 0.2 mm. In a most preferred embodiment, the mesh size ranges from 0.05 to 0.15 mm. The sum of the cross-sections of the drill holes, in a preferred embodiment comprises 20 to 30% of the perforated plate.

Description of the feedstocks

Polyetherpolyol 1

Polyetherpolyol with an OH number of 45 with mainly secondary OH-groups formed by adding 85 wt. % of propylene oxide and 15 wt. % of ethylene oxide to trimethylolpropane as starter.

Polyetherpolyol 2

Polyetherpolyol 2 with an OH number of 180 and with mainly primary terminal OH groups formed by adding 80 wt. % of propylene oxide and 20 wt. % of terminal ethylene oxide to sorbitol as starter.

Isocyanate 1

Toluylene diisocyanate with 80 wt. % of the 2,4-isomer and 20 wt. % of the 2,6-isomer.

Isocyanate 2

Toluylene diisocyanate with 65 wt. % of the 2,4-isomer and 35 wt. % of the 2,6-isomer.

PROCESSING EXAMPLES

The following were reacted in a UBP foaming unit from the Hennecke Co., D 53754 Birlinghoven, fitted with a perforated plate decompression chamber as described in U.S. Pat. No. 5,789,457.

Example 1

| | |
|---|---|
| Polyol 1 (B1) | 85 parts by wt. |
| Polyol 2 (B2) | 15 parts by wt. |
| Activator A1 (Air Products) | 0.1 parts by wt. |
| Stabilizer OS 22 (Bayer AG) | 1.3 parts by wt. |
| Tin diethylhexanoate | 0.1 parts by wt. |
| Water | 4.2 parts by wt. |
| Liquid $CO_2$ | 4.0 parts by wt. |
| Isocyanate 1 | 34.0 parts by wt. |
| Isocyanate 2 | 22.7 parts by wt. |
| Total TDI | 56.7 parts by wt. |

It is possible to prepare a slabstock foam, which can be controlled without any problem, with respect to run-length, freedom from streaks, base zone and cell structure.

Mechanical properties:

| | |
|---|---|
| Density | 16.8 kg/m$^3$ |
| Tensile strength | 92 kPa |
| Elongation at break | 120% |
| Compressive strength | 2.9 kPa |
| Rebound elasticity | 46% |

The pressure-reduction perforated plates in the decompression chamber did not present a coating after a long period of operation although an active polyol was processed.

Example 2

| | |
|---|---|
| Polyol 1 (B1) | 90 parts by wt. |
| Polyol 2 (B2) | 10 parts by wt. |
| Activator A1 (Air Products) | 0.1 parts by wt. |
| Stabilizer OS 22 (Bayer) | 1.3 parts by wt. |
| Tin diethylhexanoate | 0.13 parts by wt. |
| Water | 4.2 parts by wt. |
| Liquid $CO_2$ | 3.0 parts by wt. |
| Isocyanate 1 | 47.8 parts by wt. |
| Isocyanate 2 | 8.9 parts by wt. |
| Total TDI | 56.7 parts by wt. |

The slab could be prepared with production reliability over a long period of time.

Mechanical properties:

| | |
|---|---|
| Density | 18.3 kg/m$^3$ |
| Tensile strength | 100 kPa |
| Elongation at break | 100% |
| Compressive strength | 3.3 kPa |
| Rebound elasticity | 47% |

Example 3

| | |
|---|---|
| Polyol 1 (B1) | 85 parts by wt. |
| Polyol 2 (B2) | 15 parts by wt. |
| Activator A1 (Air Products) | 0.1 parts by wt. |
| Stabilizer OS 22 (Bayer AG) | 1.3 parts by wt. |
| Tin diethylhexanoate | 0.13 parts by wt. |
| Water | 4.2 parts by wt. |
| Liquid $CO_2$ | 3.0 parts by wt. |
| Isocyanate 1 | 48.2 parts by wt. |
| Isocyanate 2 | 8.5 parts by wt. |
| Total TDI | 56.7 parts by wt. |

The slab could be prepared with production reliability over a long period of time.

Mechanical properties:

| | |
|---|---|
| Density 1 | 8.4 kg/m$^3$ |
| Tensile strength | 99 kPa |
| Elongation at break | 120% |
| Compressive strength | 3.5 kPa |
| Rebound elasticity | 47% |

Example 4 (comparison)

| | |
|---|---|
| Polyol 1 | 100 parts by wt. |
| Polyol 2 | — |
| Activator A1 (Air Products) | 0.1 parts by wt. |
| Stabilizer OS 22 | 1.3 parts by wt. |
| Tin diethylhexanoate | 0.1 wt. % |
| Water | 5.0 parts by wt. |
| Methylene chloride | 6.0 parts by wt. |
| Isocyanate 1 | 60.5 parts by wt. |

Mechanical properties:

| | |
|---|---|
| Density | 17.0 kg/m$^3$ |
| Tensile strength | 90 kPa |
| Elongation at break | 95% |

-continued

| | |
|---|---|
| Compressive strength | 2.4 kPa |
| Rebound elasticity | 40% |

In Example 4, a much lower hardness is achieved than in Example 1 according to the present invention, although in Example 4, the amount of isocyanate is substantially larger. The comparable density, however, is linked to the use of methylene chloride. The use of a combination of isocyanates, as in Example 1, leads to instability in the slab.

Example 5 (comparison)

| | |
|---|---|
| Polyol 1 | 100 parts by wt. |
| Polyol 2 | — |
| Activator A1 | 0.1 parts by wt. |
| Stabilizer OS 22 | 1.3 parts by wt. |
| Tin diethylhexanoate | 0.13 wt. % |
| Water | 4.7 parts by wt. |
| Liquid $CO_2$ | 3.0 parts by wt. |
| Isocyanate 1 | 56.7 parts by wt. |

Mechanical properties

| | |
|---|---|
| Density | 17.0 kg/m$^3$ |
| Tensile strength | 110 kPa |
| Elongation at break | 95% |
| Compressive strength | 1.9 kPa |
| Rebound elasticity | 42% |

The maximum amount of isocyanate which can be used in Example 5, without methylene chloride, i.e. without causing core discoloration damage, produces expanded materials in Example 1 with substantially higher compressive strengths and better elasticity. When using a combination of isocyanates, as in Example 1, there is instability in the expanded materials.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing elastic, flexible slabstock foams by acting
   A) polyisocyanates with
   B1) at least one polyol having a molecular weight from 2,000 to 10,000, having a functionality of 2 to 4, which have at least two hydrogen atoms capable of reacting with said polyisocyanates;
   B2) at least one polyol having a molecular weight from 400 to 3,000, having a functionality of 4 to 8 and having at least four hydrogen atoms capable of reacting with isocyanates;
   C) water and optionally, organic blowing agents;
   D) stabilizers;
   E) activators;
   F) additives and auxiliary agents;
   G) optionally, low molecular weight cross-linking agents with a molecular weight of 32 to 399; and
   H) liquid $CO_2$, which is used as an additional blowing agent and is decompressed in a decompression chamber containing fine-meshed gratings upstream of the discharge point to the conveyer belt.

2. A process according to claim 1, characterized in that said component B1) has a functionality of 3.0–4.0, and a molecular weight of 3,000 to 5,000 with largely secondary OH-groups and said component B2) has a functionality of 4–6, and a molecular weight of 500–3,000 and largely primary OH-groups.

3. A process according to claim 1, wherein a starter for said component B2) is selected from the group comprising mannitol, sorbitol, sucrose and lactose.

4. A process according to claim 1, wherein said component B2) contains 10–30 % of terminal ethylene oxide.

5. A process according to claim 4, wherein said component B2) comprises 15 to 25 wt. % of terminal ethylene oxide.

6. A process according to claim 1, wherein said component B1) is present in the amount of 97.5 to 70 parts by weight and said component B2) is present in the amount of 2.5 to 30 parts by weight with respect to 100 parts by weight of said components B1) and B2).

7. A process according to claim 6, wherein said component B1) is present in the ratio of 97.5 to 80 parts by weight and said component B2) is present in the amount of 2.5 to 20 parts by weight with respect to 100 parts by weight of said components B1) and B2).

8. A process according to claim 1 wherein said liquid carbon dioxide is decompressed in streams comprising said components A) to H) in a decompression chamber containing perforated plates.

9. A process according to claim 8, wherein said decompression chamber for reducing the pressure in said streams comprising said components A) to H) consists of at least one perforated plate with a mesh size of 0.025 to 0.3 mm, wherein the sum of the cross-sections of the drill holes comprises 10 to 40 % of said perforated plate.

10. A process according to claim 9, wherein said mesh size is from 0.05 to 0.2 mm.

11. A process accordingly to claim 9, wherein said mesh size is from 0.05 to 1.5 mm.

12. A process according to claim 9, wherein said sum of the cross-sections of said drill holes comprises 20 to 30% of said perforated plate.

* * * * *